3,193,428
LAMINATION OF POLYMERIC 3,3-BIS(CHLORO-METHYL) OXETANE TO BUTADIENE-ACRYL-ONITRILE RUBBER
David A. Palmer, Wilmington, Del., assignor to Hercules Powder Company, Wilmington, Del., a corporation of Delaware
No Drawing. Filed Nov. 15, 1961, Ser. No. 152,619
7 Claims. (Cl. 156—244)

The present invention relates to a process for preparing laminates comprising a layer of butadiene-acrylonitrile rubber (Buna N) adhesively secured to a layer of polymeric 3,3-bis(chloromethyl)oxetane.

Polymers of 3,3 - bis(chloromethyl)oxetane having molecular weights in excess of 10,000 are known thermoplastic resins that are characterized by chemical inertness. Because of this inertness, these polymers have been found well suited for use as linings for equipment intended for the storage or processing of chemicals.

While the utility of polymeric 3,3-bis(chloromethyl) oxetane as a chemically inert lining for various types of chemical processing apparatus has been well established, the problem of adhering these polymers to the apparatus, especially metal apparatus, has not been entirely solved. More specifically, difficulties are presently encountered in obtaining a satisfactory bond between the polymers and the metal surfaces of such apparatus. While many adhesives and many methods of fabrication have been employed to bond the polymers to metal, no fully satisfactory adhesive or method has yet been found.

In accordance with the present invention, it has been found that polymeric 3,3-bis(chloromethyl)oxetane can be strongly bonded to unvulcanized butadiene-acrylonitrile rubber by a process that comprises contacting these two materials, i.e., rubber and polymer, while the temperature at their interface is at least momentarily above about 320° F. There is obtained by this process a bond that exceeds the strength of the rubber, a result that is most surprising in view of the fact that other known rubbers such as SBR, natural rubber, butyl rubber, poly(chloroprene), and ethylene-propylene copolymer rubber will not adhere to polymeric 3,3-bis(chloromethyl)oxetane when laminated thereto by the same procedure. In other words, butadiene-acrylonitrile rubber is definitely unique in its ability to be bonded to polymeric 3,3-bis(chloromethyl)oxetane by the process of the invention.

The practical significance of the invention lies in the fact that there are several known rubber-to-metal adhesives which are capable of bonding butadiene-acrylonitrile rubber to metal to provide a permanent and lasting bond. Thus, it is possible to bond the laminates of the invention to metal, via rubber-to-metal adhesion, and thereby effectively provide the metal with a chemically inert surface of polymeric 3,3-bis(chloromethyl)oxetane.

There are several variations of manipulative procedure that can be employed in the process of the invention. One method comprises forming the laminate by extruding molten polymeric 3,3-bis(chloromethyl)oxetane onto a moving web of unvulcanized butadiene-acrylonitrile rubber and then cooling the resultant laminate. Another method is to superimpose sheets of polymeric 3,3-bis-(chloromethyl)oxetane and unvulcanized butadiene-acrylonitrile rubber and subject the assembly to modest pressure sufficient to assure uniform contact of the two materials while heating to a temperature above about 320° F., but preferably in this case below the melting point of the polymer, and then allowing the assembly to cool. Still another method comprises heating one side of a sheet of polymeric 3,3-bis(chloromethyl)oxetane to a temperature above about 320° F., superimposing a sheet of unvulcanized butadiene-acrylonitrile rubber on the heated surface under modest pressure, and thereafter allowing the assembly to cool. In all of these methods the rubber employed can contain vulcanizing agents, fillers, and other additives as required for vulcanization. The rubber can thus be vulcanized simultaneously with the formation of the laminate by simply holding the assembly at a temperature and for a time that will effect vulcanization. Alternatively, however, the time and temperature for forming the laminate can be considerably less drastic than required for vulcanization of the rubber, and the rubber can then be vulcanized subsequently.

By still another modification of the invention, the polymeric 3,3-bis(chloromethyl)oxetane can be laminated to the butadiene-acrylonitrile rubber and the rubber in turn bonded to a metal surface, and vulcanized, all in one operation. Thus, for instance, an assembly comprising a layer of polymeric 3,3-bis(chloromethyl)oxetane, unvulcanized butadiene-acrylonitrile rubber, and metal, in the order specified, can be heated under modest pressure to a temperature above 320° F. but below the melting point of the polymer and held for a sufficient length of time to effect vulcanization of the rubber while simultaneously creating a bond between the various strata of the laminate. In this embodiment, of course, there can be used any of several known adhesives to bond the rubber and metal.

As already emphasized, the essence of the invention resides in the discovery that butadiene-acrylonitrile rubber can be adhesively bonded to polymeric 3,3-bis(chloromethyl)oxetane by contacting the two materials while the temperature at their interface is at least momentarily above about 320° F. The reasons for the success of the invention are obscure but are evidently related to the fact that at the temperature required to form the bond polymeric 3,3-bis(chloromethyl)oxetane, which is a normally crystalline polymer, is predominantly, or entirely, amorphous. That is to say that although the crystalline melting point of the polymer is in the neighborhood of 368° F. (the temperature at which the last trace of crystallinity disappears), as the temperature is increased from room temperature the polymer begins to soften noticeably at 320° F. and is predominantly amorphous at that temperature.

The following examples are presented for purposes of illustration; parts and percentages are by weight unless otherwise specified.

*Example 1*

A butadiene-acrylonitrile rubber prepared by the copolymerization of 73 parts of butadiene-1,3 with 27 parts of acrylonitrile was compounded with filler, plasticizer, and vulcanizing agents as follows:

| | Parts |
|---|---|
| Butadiene-acrylonitrile rubber (Paracril "B") | 100 |
| High abrasion furnace black | 50 |
| Zinc oxide | 3 |
| Hydrogenated fish oil beads | 1 |
| Altax | 1.5 |
| Tetramethyl thiuram disulfide | 0.1 |
| Sulfur | 1.75 |
| Dioctyl phthalate | 30 |

The rubber compound was removed from the mill as a sheet 40 to 50 mils thick. There was superimposed on a 6 inch by 6 inch piece of this sheet a 40 mil thick sheet of polymeric 3,3 - bis(chloromethyl)oxetane (molecular weight in excess of 10,000) of the same size. This assembly was then compression molded at 350° F. for 3 minutes in a mold having a controlled thickness of 75 mils.

The laminate, removed from the mold and allowed to cool to room temperature, was next tested for the strength of the bond in an Instron peel tester using a 180° peel at 23° C. at a peel rate of 12 inches per minute. In this test the bond remained intact and failure occurred in the rubber at a peel stress of 23 pounds per inch of peel.

When the procedure of this example was followed with the substitution of other rubbers in place of the butadiene-acrylonitrile rubber, the highest peel strength obtained in any case was 5.5 pounds per inch of peel with failure occurring at the bond between the rubber and polymeric 3,3-bis(chloromethyl)oxetane. The rubber so evaluated for comparative purposes included SBR (styrene-butadiene rubber), natural rubber, butyl rubber, poly(chloroprene), and ethylene-propylene copolymer rubber. Thus, the evidence is overwhelming that butadiene-acrylonitrile rubber has unique utility in the process of the invention.

Example 2

In this example a sheet of butadiene-acrylonitrile rubber compounded as in Example 1 was continuously unwound from a storage roll and passed between the nip of two rolls, one having a temperature of 200° F. and the other having a temperature of 75° F., rotating in opposite directions at the rate of 5 feet per minute. Just prior to the entry of the rubber sheet into the nip of these rolls, a film of molten polymeric 3,3-bis(chloromethyl)oxetane (molecular weight in excess of 10,000) was extruded onto the surface of the rubber sheet on its side adjacent the 200° F. roll. There emerged from the nip rolls a laminate of the polymer in rubber in which the thickness of the rubber was 20 mils and the thickness of the polymer 40 mils.

This laminate was then bonded to a steel plate by sandblasting the plate, coating it with a rubber-to-metal adhesive, and superimposing the laminate with the rubber side facing the steel. This assembly was then cured in a heated press under the following conditions:

Pressure _____p.s.i__ 250
Temperature _____° F__ 285
Time _____minutes__ 30 during which time vulcanization of the rubber took place. The resulting steel-rubber-polymer laminate had a 90° peel strength of 47 pounds per inch by the test conditions described in Example 1. Failure occurred in the rubber with part of the rubber adhering to the polymer and part to the steel.

Both materials laminated by the process of the invention are well known. Polymeric 3,3-bis(chloromethyl)oxetanes having molecular weights over 10,000 are commonly prepared by the polymerization of 3,3-bis(chloromethyl) oxetane using boron trifluoride, triethylaluminum, or other catalysts. They are normally solid polymers having a high degree of crystallinity and a birefringent melting point of about 368° F.

The butadiene-acrylonitrile rubber, often called Buna N, is prepared by the copolymerization of a major amount of butadiene with a minor amount of acrylonitrile, usually by emulsion polymerization techniques.

The process of the invention requires only that the two materials, usually, but not necessarily, in the form of sheets, be brought into contact with the temperature of the polymer at the interface at least momentarily at about 320° F. or above. Depending on the method used, pressure is often desirable to bring the materials into uniform and intimate contact. The surface of the polymer can be preheated before contacting the two materials, or the materials can be brought together and the entire assembly heated. The time which the two materials are in contact with the polymer surface at the desired temperature is immaterial in forming the desired bond. It is material, however, in determining whether or not the rubber becomes vulcanized. In other words, the duration of contact may be so short as to avoid vulcanization of the rubber or long enough, and the temperature high enough, to effect vulcanization, depending on which result is desired.

The preceding discussion has emphasized the importance of having the surface of the polymer at its interface with the rubber reach a temperature of at least about 320° F. The maximum temperature, on the other hand, is limited only by the decomposition of the polymer, but for most purposes a maximum of about 350° F. is observed. Of course, in those embodiments of the invention where the laminate is compressed during manufacture, it is desirable to maintain the temperature of the polymer below its melting point, preferably below 368° F., during the application of pressure.

What I claim and desire to protect by Letters Patent is:

1. A process for preparing a laminate comprising a layer consisting essentially of plasticized, vulcanizable butadiene-acrylonitrile rubber containing a major portion of butadiene adhesively secured to a layer of a homopolymer of 3,3-bis(chloromethyl)oxetane having a molecular weight in excess of 10,000, which comprises contacting the said rubber in the unvulcanized state and said polymer while the temperature at their interface is at least momentarily above about 320° F.

2. The process according to claim 1 in which the laminate of that claim is bonded to metal by cementing the rubber side of the laminate to the metal.

3. A process for preparing a laminate comprising a layer consisting essentially of plasticized, vulcanizable butadiene-acrylonitrile rubber containing a major portion of butadiene adhesively secured to a layer of a homopolymer of 3,3-bis(chloromethyl)oxetane having a molecular weight in excess of 10,000, which comprises extruding a sheet of said homopolymer of 3,3-bis(chloromethyl)oxetane having a molecular weight in excess of 10,000 onto a moving web of unvulcanized butadiene-arycionitrile rubber, and cooling the resultant laminate.

4. A process for preparing a laminate comprising a layer consisting essentially of plasticized, vulcanizable butadiene-acrylonitrile rubber containing a major portion of butadiene adhesively secured to a layer of a homopolymer of 3,3-bis(chloromethyl)oxetane having a molecular weight in excess of 10,000, which comprises superimposing a sheet of said homopolymer of 3,3-bis(chloromethyl)oxetane having a molecular weight in excess of 10,000 upon a sheet of unvulcanized butadiene-acrylonitrile rubber and subjecting the assembly to pressure sufficient to assure uniform contact of the polymer and rubber while heating the assembly to a temperature above about 320° F. but below the melting point of the polymer, and then cooling the assembly.

5. A process for preparing a laminate comprising a layer consisting essentially of plasticized, vulcanizable butadiene-acrylonitrile rubber containing a major portion of butadiene adhesively secured to a layer of a homopolymer of 3,3-bis(chloromethyl)oxetane having a molecular weight in excess of 10,000, which comprises heating at least one side of a sheet of said polymer to a temperature above about 320° F., superimposing a sheet of unvulcanized butadiene-acrylonitrile rubber on the heated surface of the polymer sheet, and allowing the assembly to cool.

6. A process of forming a laminate comprising a layer of metal, a layer consisting essentially of plasticized, unvulcanized butadiene-acrylonitrile rubber containing a major portion of butadiene, and a layer of a homopolymer of 3,3-bis(chloromethyl)oxetane, which comprises forming an assembly of the metal, rubber, and polymer, in the order named, and subjecting the assembly to heat and pressure to raise the temperature at the interface of the rubber and polymer at least momentarily to above about 320° F., and then cooling the assembly.

7. A process for preparing a laminate comprising a layer consisting essentially of vulcanized butadiene acrylonitrile rubber containing a major portion of butadiene adhesively secured to a layer of a homopolymer of 3,3-bis(chloromethyl)oxetane having a molecular weight in excess of 10,000, which comprises contacting the said rubber in the unvulcanized state and said polymer while the temperature at their interface is at least momentarily above about 320° F. and thereafter vulcanizing the rubber.

References Cited by the Examiner

UNITED STATES PATENTS

| | | | |
|---|---|---|---|
| 2,722,340 | 11/55 | Feld et al. | 260—2 |
| 2,764,575 | 9/56 | Kohler et al. | 260—2 |
| 2,905,647 | 9/59 | Goddn | 260—20 X |
| 2,947,722 | 8/60 | Boardman | 156—244 |
| 2,977,248 | 3/61 | Flowers | 117—161 |

ALEXANDER WYMAN, *Primary Examiner.*

EARL M. BERGERT, *Examiner.*